(12) United States Patent
Thomas et al.

(10) Patent No.: US 11,125,157 B2
(45) Date of Patent: Sep. 21, 2021

(54) ADVANCED INLET DESIGN

(71) Applicant: The Boeing Company, Chicago, IL (US)

(72) Inventors: Holly J. Thomas, Chicago, IL (US); Brian L. Riedel, Summerville, SC (US); Alexandre D. Curaudeau, Charleston, SC (US); David W. Foutch, Seattle, WA (US); Steve G. Mackin, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 395 days.

(21) Appl. No.: 15/880,496

(22) Filed: Jan. 25, 2018

(65) Prior Publication Data

US 2019/0093557 A1 Mar. 28, 2019

Related U.S. Application Data

(60) Provisional application No. 62/562,232, filed on Sep. 22, 2017.

(51) Int. Cl.
| | |
|---|---|
| *F02C 7/047* | (2006.01) |
| *B64D 15/22* | (2006.01) |
| *B64D 15/08* | (2006.01) |
| *B64D 33/02* | (2006.01) |
| *F02C 7/045* | (2006.01) |

(Continued)

(52) U.S. Cl.
CPC ............... *F02C 7/047* (2013.01); *B64D 15/08* (2013.01); *B64D 15/22* (2013.01); *B64D 33/02* (2013.01); *F02C 7/045* (2013.01); *F02K 3/06* (2013.01); *B64D 2033/0206* (2013.01); *B64D 2033/0233* (2013.01); *B64D 2033/0286* (2013.01); *F05D 2220/323* (2013.01); *F05D 2260/96* (2013.01)

(58) Field of Classification Search
CPC ........ B64D 15/06; B64D 15/08; B64D 33/02; B64D 2033/0206; B64D 2033/0233; F02C 7/045; F02C 7/047; F01D 25/02; F01D 25/04; F01D 25/10
See application file for complete search history.

(56) References Cited

U.S. PATENT DOCUMENTS

| | | |
|---|---|---|
| 5,313,202 A | 5/1994 | Hansman, Jr. et al. |
| 5,523,959 A | 6/1996 | Seegmiller |
| | (Continued) | |

FOREIGN PATENT DOCUMENTS

| | | |
|---|---|---|
| EP | 1495963 | 1/2005 |
| EP | 3103723 | 12/2016 |
| | (Continued) | |

OTHER PUBLICATIONS

Russian Office Action (with English Translation) dated Dec. 12, 2019 for Russian Patent Appln No. 2018129316/06(047171).

(Continued)

*Primary Examiner* — J. Todd Newton, Esq.
*Assistant Examiner* — Eric J Zamora Alvarez
(74) *Attorney, Agent, or Firm* — Gates & Cooper LLP

(57) ABSTRACT

A compact inlet design including a single bulkhead and/or an acoustic panel extending into nacelle lip region for noise reduction. The compact inlet is used with a low power fluid ice protection system capable of preventing ice build-up on the acoustic panel in the nacelle lip region.

21 Claims, 12 Drawing Sheets

(51) Int. Cl.
  *B64D 29/00* (2006.01)
  *B64D 33/00* (2006.01)
  *F02K 3/06* (2006.01)

(56) References Cited

U.S. PATENT DOCUMENTS

| | | |
|---|---|---|
| 5,589,822 A | 12/1996 | Stern |
| 5,617,076 A | 4/1997 | Stern |
| 5,760,711 A | 6/1998 | Burns |
| 5,838,239 A | 11/1998 | Stern et al. |
| 5,921,501 A | 7/1999 | Pernick |
| 6,010,095 A | 1/2000 | Hackmeister |
| 6,052,056 A | 4/2000 | Burns et al. |
| 6,178,740 B1 | 1/2001 | Su et al. |
| 6,207,940 B1 | 3/2001 | Feher et al. |
| 6,286,370 B1 | 9/2001 | Sinha |
| 6,371,411 B1 | 4/2002 | Breer et al. |
| 6,457,676 B1 | 10/2002 | Breer et al. |
| 6,642,490 B2 | 11/2003 | Feher |
| 6,688,558 B2 | 2/2004 | Breer et al. |
| 6,819,265 B2 | 11/2004 | Jamieson et al. |
| 7,370,525 B1 | 5/2008 | Zhao et al. |
| 7,377,109 B2 | 5/2008 | Viswanathan |
| 7,439,877 B1 | 10/2008 | Jarvinen |
| 7,588,212 B2 * | 9/2009 | Moe ............... B64D 15/12 244/134 D |
| 7,836,700 B2 | 11/2010 | Viswanathan |
| 7,870,929 B2 | 1/2011 | Farstad |
| 7,923,668 B2 * | 4/2011 | Layland ............ B64D 33/02 219/535 |
| 7,933,002 B2 | 4/2011 | Halldorsson |
| 8,144,325 B2 | 3/2012 | Ray et al. |
| 8,152,461 B2 * | 4/2012 | Howarth ............ F02C 7/04 415/213.1 |
| 8,325,338 B1 | 12/2012 | Pope et al. |
| 8,439,308 B2 | 5/2013 | Armstrong et al. |
| 8,462,354 B2 | 6/2013 | Barnes |
| 8,517,601 B2 | 8/2013 | Stothers et al. |
| 8,532,961 B2 | 9/2013 | Guo |
| 8,651,415 B1 | 2/2014 | Sparks |
| 8,757,551 B2 | 6/2014 | Margalit |
| 8,820,477 B1 | 9/2014 | Herrera et al. |
| 8,910,482 B2 | 12/2014 | Parham |
| 9,021,813 B2 | 5/2015 | Jasklowski et al. |
| 9,145,801 B2 | 9/2015 | Lan et al. |
| 9,168,716 B2 | 10/2015 | Benedetti et al. |
| 9,242,735 B1 | 1/2016 | Meis et al. |
| 9,284,726 B2 | 3/2016 | Tien |
| 9,347,321 B2 | 5/2016 | Heidari et al. |
| 9,429,680 B2 | 8/2016 | Grzych et al. |
| 9,469,408 B1 | 10/2016 | Elangovan et al. |
| 9,511,873 B2 | 12/2016 | Mengle |
| 9,546,004 B1 | 1/2017 | Safai et al. |
| 9,604,438 B2 | 3/2017 | Lumbab et al. |
| 9,617,918 B2 | 4/2017 | Jamshidiat et al. |
| 9,623,977 B2 | 4/2017 | Runyan et al. |
| 9,640,164 B2 | 5/2017 | Gerken et al. |
| 9,676,485 B2 | 6/2017 | Stothers et al. |
| 9,696,238 B2 | 7/2017 | Bosetti et al. |
| 9,719,466 B2 | 8/2017 | Nakhjavani |
| 9,732,700 B2 | 8/2017 | Cerra et al. |
| 9,741,331 B1 | 8/2017 | Alam et al. |
| 9,776,731 B1 | 10/2017 | Lieberman et al. |
| 9,803,586 B1 | 10/2017 | Jackowski et al. |
| 10,077,740 B2 | 9/2018 | Kawai et al. |
| 10,173,248 B2 | 1/2019 | Dean et al. |
| 10,173,780 B2 | 1/2019 | Mackin et al. |
| 10,184,425 B2 | 1/2019 | Jackowski et al. |
| 10,273,883 B2 | 4/2019 | Roach et al. |
| 10,309,341 B2 | 6/2019 | Harpel et al. |
| 10,343,094 B2 | 6/2019 | Kleshchev et al. |
| 10,431,516 B2 | 10/2019 | Miyata et al. |
| 2002/0139900 A1 * | 10/2002 | Porte ............... B64D 15/04 244/134 C |
| 2004/0036630 A1 | 2/2004 | Jamieson et al. |
| 2005/0087720 A1 | 4/2005 | Samuels et al. |
| 2005/0263646 A1 | 12/2005 | Nichols |
| 2010/0328644 A1 | 12/2010 | Lu et al. |
| 2011/0131945 A1 | 6/2011 | Vauchel et al. |
| 2012/0085868 A1 | 4/2012 | Barnes |
| 2012/0274938 A1 | 11/2012 | Ray |
| 2013/0020433 A1 | 1/2013 | Hoisington |
| 2013/0113926 A1 | 5/2013 | Chen et al. |
| 2013/0320145 A1 | 12/2013 | McGillis et al. |
| 2014/0001284 A1 | 1/2014 | Porte et al. |
| 2014/0055611 A1 | 2/2014 | Wong et al. |
| 2014/0117106 A1 | 5/2014 | Acheson et al. |
| 2015/0044028 A1 * | 2/2015 | Lord ............... F01D 25/24 415/115 |
| 2015/0044030 A1 | 2/2015 | Forsyth |
| 2015/0108233 A1 | 4/2015 | Wright |
| 2015/0113999 A1 | 4/2015 | Tretow et al. |
| 2015/0260099 A1 | 9/2015 | Gally et al. |
| 2015/0260104 A1 | 9/2015 | Wilson et al. |
| 2015/0274304 A1 | 10/2015 | Gray et al. |
| 2015/0314882 A1 * | 11/2015 | Lumbab ............ B64D 29/06 415/119 |
| 2016/0024963 A1 | 1/2016 | Lumbab et al. |
| 2016/0061115 A1 | 3/2016 | Cerra et al. |
| 2016/0102610 A1 * | 4/2016 | Caruel ............... F02C 7/047 244/134 R |
| 2016/0236798 A1 | 8/2016 | Batt et al. |
| 2016/0311542 A1 | 10/2016 | Mackin |
| 2016/0341150 A1 | 11/2016 | Chuck et al. |
| 2016/0356180 A1 | 12/2016 | Bol |
| 2016/0363097 A1 | 12/2016 | Foutch |
| 2017/0008635 A1 | 1/2017 | Mackin et al. |
| 2017/0022903 A1 | 1/2017 | Nesbitt et al. |
| 2017/0057618 A1 | 3/2017 | Khozikov et al. |
| 2017/0057644 A1 | 3/2017 | Khozikov et al. |
| 2017/0122257 A1 | 5/2017 | Sankrithi |
| 2017/0158336 A1 | 6/2017 | Meis et al. |
| 2017/0158341 A1 | 6/2017 | Kawai et al. |
| 2017/0166314 A1 | 6/2017 | Meis et al. |
| 2017/0166777 A1 | 6/2017 | Berry et al. |
| 2017/0190431 A1 | 7/2017 | Dichek et al. |
| 2017/0198658 A1 | 7/2017 | Higgins |
| 2017/0204291 A1 | 7/2017 | Berry et al. |
| 2017/0210478 A1 | 7/2017 | Mackin |
| 2017/0233090 A1 * | 8/2017 | Crawford ............ F02C 7/04 415/220 |
| 2017/0233106 A1 | 8/2017 | Svanebjerg et al. |
| 2017/0283078 A1 | 10/2017 | Lousside et al. |
| 2017/0313428 A1 | 11/2017 | Mackin et al. |
| 2018/0009547 A1 | 1/2018 | Brewer |
| 2018/0016981 A1 | 1/2018 | Herrera et al. |
| 2018/0018952 A1 | 1/2018 | Herrera |
| 2018/0029719 A1 | 2/2018 | Follet et al. |
| 2018/0058373 A1 | 3/2018 | Gaw et al. |
| 2018/0079511 A1 | 3/2018 | Mackin |
| 2018/0079512 A1 | 3/2018 | Jackowski et al. |
| 2018/0086473 A1 | 3/2018 | Joel |
| 2018/0119640 A1 | 5/2018 | Howe |
| 2018/0155042 A1 | 6/2018 | Labelle et al. |
| 2018/0162541 A1 | 6/2018 | Jasklowski et al. |
| 2018/0202313 A1 | 7/2018 | Jasklowski |
| 2018/0033978 A1 | 11/2018 | Leon et al. |
| 2018/0339785 A1 | 11/2018 | Waldrop et al. |
| 2018/0371995 A1 | 12/2018 | Dorsey et al. |
| 2018/0371996 A1 | 12/2018 | Hoisington et al. |
| 2019/0031363 A1 | 1/2019 | Hoisington |
| 2019/0009983 A1 | 4/2019 | Bol et al. |

FOREIGN PATENT DOCUMENTS

| | | |
|---|---|---|
| FR | 2990928 | 11/2013 |
| GB | 2112339 | 7/1983 |
| GB | 2130158 | 5/1984 |
| RU | 2411161 | 2/2011 |
| WO | 99/16034 | 4/1994 |
| WO | 2010/012899 | 2/2010 |

(56) References Cited

OTHER PUBLICATIONS https://en.wikipedia.org/wiki/VFW-Fokker_614, Aug. 1, 2017, 7 pages.
Extended European Search Report dated Feb. 21, 2019 for European Application No. 18195816.6.
Russian Office Action dated Jul. 12, 2019 for Russian Application No. 2018129316/06.
Extended European Search Report dated Nov. 9, 2020 for European Patent Application No. 20179810.5.

* cited by examiner

ADVANCED INLET DESIGN

CROSS REFERENCE TO RELATED APPLICATIONS

This application claims the benefit under 35 U.S.C. Section 119(e) of commonly-assigned U.S. Provisional Patent Application No. 62/562,232, filed Sep. 22, 2017, by Holly J. Thomas, Brian L. Riedel, Alexandre D. Curaudeau, David W. Foutch, and Steve G. Mackin, entitled "ADVANCED INLET DESIGN," which application is incorporated by reference herein.

BACKGROUND

1. Field

The present disclosure describes a novel inlet for an aircraft engine.

2. Description of the Related Art

FIG. 1 is a schematic view of an exemplary aircraft engine 60. Engine 60 includes a nacelle 62 that generally includes a fan section 64, a compressor section 66, a combustion section 68, and a turbine section 70. Engine 60 is typically attached to the wings, fuselage, or tail of an aircraft through appropriate mountings, for example, a pylon 71. Nacelle 62 includes an engine inlet 72 having an outer barrel 74 and an inner barrel 76. In the exemplary implementation, acoustic panel or panels 10 are arranged to form at least a portion of inner barrel 76 such that the inner barrel 76 defines an air intake duct 78 for supplying air 55 to the fan 64, which subsequently is directed both to the bypass duct and engine core, comprising the compressor 66, combustor 68 and turbine 70. Acoustic panel 10 facilitates reducing noise created by the fan 64 and the compressor 66.

FIG. 2 is a cross section 200 of the inlet in FIG. 1, illustrating the aluminum lipskin 202, a first insulated aluminum bulkhead 204 connecting the outer barrel 74 and the inner barrel 76, and a second bulkhead 206 connecting the outer barrel 74 and the inner barrel 76 at the location of the fan cowl interface 208 forward of the engine A-flange. FIG. 2 further illustrates the outer barrel 74 comprises a sandwich of composite materials 210, the inner barrel 76 includes the acoustic panel 212, thermal isolation 214 between the first insulated aluminum bulkhead 204 and the acoustic panel 212, and metallic attach flange 216 bolted to the acoustic panel 212. Acoustic panel 212 extends into the fan case 224. A Fasteners 218 attach the metallic (e.g., aluminum) lipskin 202 to the outer barrel 74, and the step and gap interface between the metallic lipskin 202 and composite outer barrel 74 creates a premature laminar to turbulent aerodynamic transition 220.

In order to prevent ice buildup on the engine inlet 72 that disrupts the intended airflow, the aircraft nacelle 62 includes an anti-ice system 250 utilizing engine bleed air 252 (engine anti-ice (EAI) system). Engine bleed air fed from the engine 60 swirls around the inside of the engine inlet 72 in the region 222 forward of the first insulated aluminum bulkhead 204, providing heat that melts ice on the engine inlet 72. However, the bleed air system has a number of limitations. Firstly, the inlet structure must accommodate high internal temperatures and pressures, which are exacerbated by a variety of failure modes and dispatch considerations. This can result in added weight and cost to the inlet, e.g. thicker material for the lipskin and additional thermal isolation features, and/or can necessitate the use of additional bleed air control valve or valves. Secondly, the engine idle power setting must be increased when the EAI system is operating, so that bleed flow extraction does not exceed engine capability in this condition. Thirdly, providing the EAI bleed air causes the engine turbine temperatures to increase. However, the maximum thrust available is limited by the maximum allowed turbine temperature, and therefore the maximum thrust available is decreased when the EAI system is operating.

Fluid ice protection systems (FIPS) may be used to prevent ice build up on aerodynamic surfaces. The fluid ice protection system utilizes Direct Current (DC) motor driven pumps to deliver the anti-icing fluid to the relevant surfaces, wherein the anti-icing fluid (typically glycol-based fluid) mixes with water droplets, lowering the freezing point of the water droplets so that the water droplets cannot freeze. The mixture of glycol-based fluid and water droplets then flow off the aircraft together.

However, conventional engine inlets are not designed for use with fluid ice protection systems. What is needed are advanced engine inlet designs that can be used with fluid ice protection systems and that exploit the benefits of the fluid ice protection system as compared to engine bleed anti-ice systems, namely increased acoustic treatment, fewer bulkheads, reduced power consumption and complexity and increased engine efficiency. The present disclosure satisfies this need.

SUMMARY

Described herein are various examples of advanced nacelle and inlet structures for a turbofan engine. The nacelle comprises an inner barrel and an outer barrel configured to form an inlet cowl. The inlet cowl includes a lipskin disposed at a forward end of the inlet cowl and between the inner barrel and the outer barrel, and a bulkhead disposed between the inner and outer barrels. The outer barrel ends at the bulkhead or extends aft of the bulkhead so as to connect with a fan cowl.

To better illustrate the nacelles described herein, a non-limiting list of examples is provided here:

In Example 1, the inner barrel includes an acoustic panel extending forward of the bulkhead. In one or more examples, the acoustic panel connects with, overlaps with, or extends onto/into the lipskin or leading edge of the inlet cowl. In other examples, the acoustic panel extends forward of the bulkhead such that a tangent to an aerodynamic line of the acoustic panel, at a forward most edge of the acoustic panel, is at an angle no less than 10 degrees relative to a direction parallel the longitudinal axis of the turbofan engine.

In Example 2, the acoustic panel of Example 1 has a forward most edge at a distance along the lipskin in a range of 0-18 inches from a forward most point on the inlet cowl.

In Example 3, the nacelle of one or any combination of previous examples includes a porous panel on the lipskin, wherein ice-protection fluid flowing or weeping from the porous panel reduces or prevents ice build-up on the acoustic panel on the lipskin.

In Example 4, the inlet cowl of one or any combination of previous examples includes a second bulkhead disposed between the inner and outer barrels and positioned aft of the other bulkhead.

In Example 5, there is only single bulkhead connecting the outer barrel and the inner barrel.

In Example 6, the nacelle of Example 5 includes a fan cowl connected to the inlet cowl. The inlet cowl includes an aerodynamic transition (e.g., laminar to turbulent flow transition) at a location between the lipskin and the fan cowl, and the single bulkhead is disposed between the inner and outer barrels at a location forward of the aerodynamic transition.

In Example 7, the inner barrel of Example 5 has an interface with a fan case, and the outer barrel has a length extending a distance in a range of 2-24 inches aft of the forward most edge of the engine fan case, thereby extending a laminar to turbulent transition aft of the forward most edge of the engine fan case.

In Example 8, the nacelle of Example 5 includes an outer mating surface between the bulkhead and the outer barrel, wherein the outer mating surface is aft of an inner mating surface between the bulkhead and the inner barrel.

In Example 9, the bulkhead of Example 8 includes a bend towards the outer mating surface.

In Example 10, the bulkhead of Example 5 is positioned in the aft half of the inlet cowl, closer to the nearest interface between the inlet cowl and the fan case than to the forward-most point 418 on the lipskin.

In Example 11, the nacelle of one or any combination of previous examples, an angle of the aerodynamic line at an upstream edge of the outer barrel is no less than 25 degrees from the longitudinal axis of the turbofan engine.

In Example 12, the acoustic panel of one or any combination of previous examples includes a flange integral with the acoustic panel and/or the inner barrel and, wherein the flange attaches the inner barrel to a fan case.

In Example 13, the acoustic panel of one or any combination of previous examples comprises a perforated sheet and a layer sandwiching a cellular structure including cells separated by cell walls. The acoustic panel extends from the lipskin to any position between the lipskin and the fan case or even extends aft of a forward most edge of the fan case so as to be disposed on or in the fan case.

In Example 14, the turbofan engine of one or any combination of previous examples is a direct drive turbofan engine, where there is no gearbox or transmission disposed between the low pressure shaft and the fan.

In Example 15, the turbofan engine of one or any combination of previous examples is a geared turbofan engine where a gearbox or transmission is disposed between the low pressure shaft and the fan.

In Example 16, the fan comprises fan blades having a leading edge and an average diameter D measured from tip to tip of the fan blades at the leading edge, the inlet cowl has a length L1 varying around a circumference of the turbofan engine, L1 is defined as the perpendicular distance from a forward most point on the lipskin to a plane defined by/including the leading edge of the fan blades, the average of the lengths L1 is defined as L1avg, and L1avg/D is in a range of 0.2-0.4.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

Figure 3:
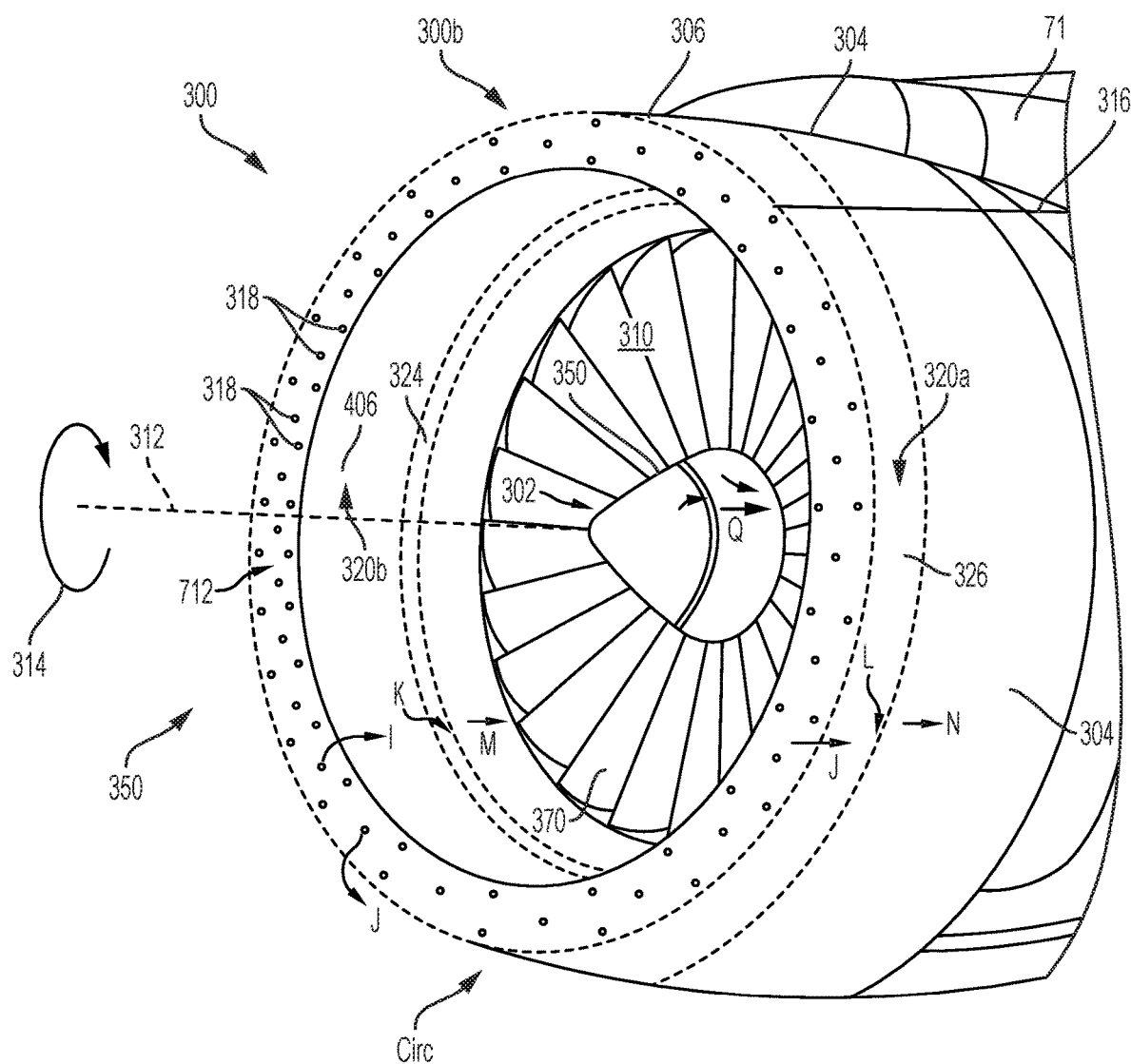
FIG. 3 illustrates a nacelle according to one or more embodiments of the present disclosure.

FIG. 3 illustrates a nacelle 300 for a turbofan engine 302, or an assembly (350) comprising a turbofan engine 302, wherein the nacelle 300 comprises an inlet 300b connected to a fan cowl 304. The inlet 300b comprises an inlet cowl 306 and the inlet cowl 306 is connected to the fan cowl 304. The nacelle 300 is disposed around the turbofan engine 302 having a fan 310 and a longitudinal axis 312 about which the fan 310 rotates 314.

Example Inlet Structures

Figure 4:
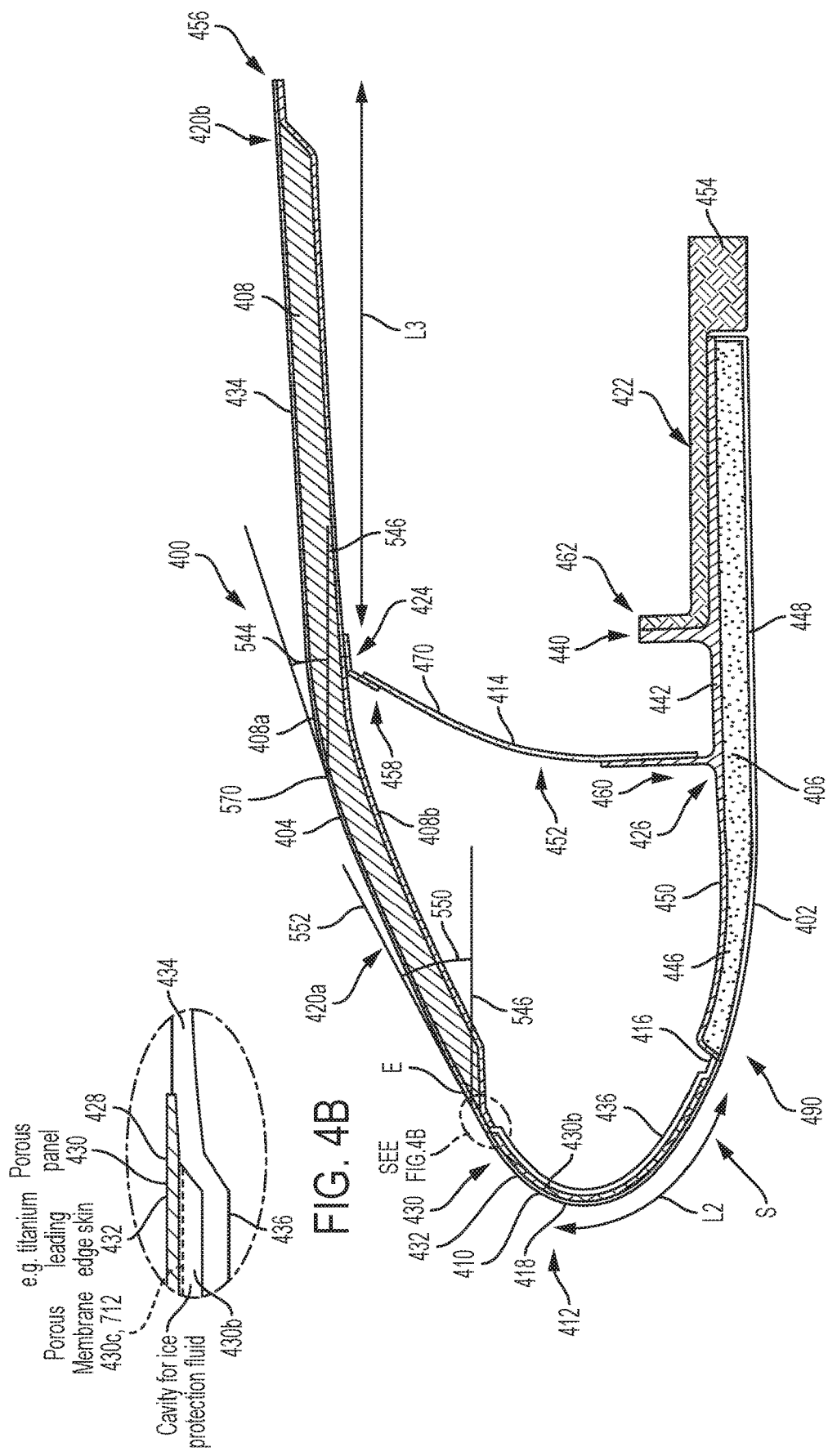
FIG. 4A and FIG. 4B illustrates a cross-section of an engine inlet according to one example.
Figure 5:
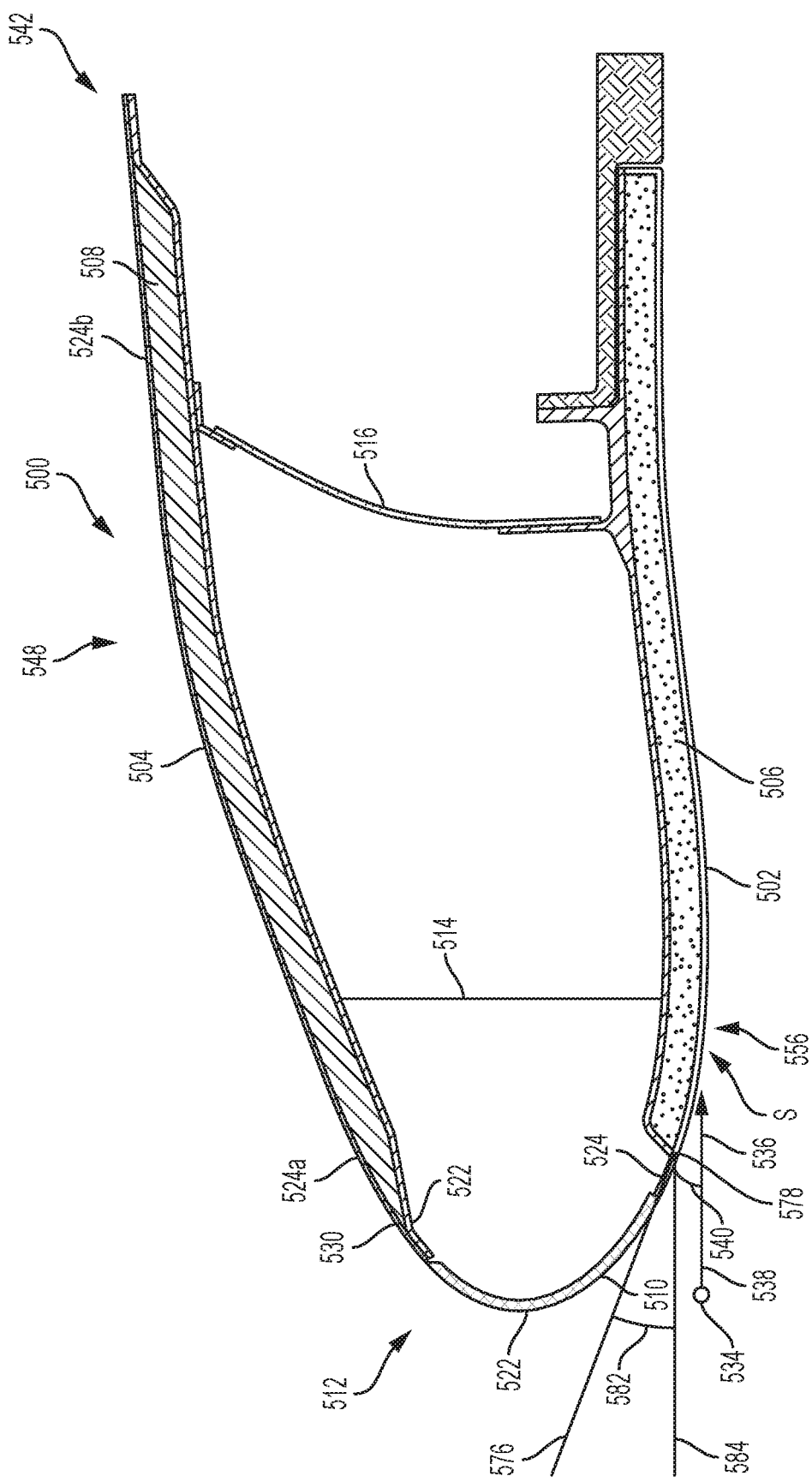
FIG. 5 illustrates a cross-section of an engine inlet according to another example.

FIG. 4A and FIG. 5 illustrate a cross-section 400, 500 of the inlet 300b along the line 316 in FIG. 3, illustrating an inner barrel (402,502) and an outer barrel (404,504) configured to form the inlet cowl (306). The inner barrel 402, 502 is combined with or includes an acoustic panel 406, 506. The inlet cowl 306 further includes a lipskin 410, 510 disposed at a forward end 412, 512 of the inlet cowl 306 and disposed between the inner barrel 402, 502 and an outer barrel 404, 504. One or more bulkheads 414, 514, 516 are disposed between the inner barrel 402 and outer barrel 404 such that the acoustic panel 406, 506 extends forward of the bulkheads 414, 514, 516. More specifically, the acoustic panel 406, 506 extends (e.g., continuously) from the fan case then forward of the bulkhead 414, 514 into the what would be the lipskin 202 area of the exemplar inlet of FIG. 2. In one or more examples, the aerodynamic line 578 of the forward most edge 416,524 of the acoustic treatment or acoustic panel 406, 506 (or a tangent 576 to an aerodynamic line 578 of the acoustic panel 406, 506 at the forward most edge 416,524) is at an angle 582 no less than 1 degree, no less than 5 degrees, or no less than 10 degrees relative to the longitudinal axis 312 of the engine 302 (or relative to a direction 584 parallel to the longitudinal axis 312).

FIG. 4A illustrates an example where the inlet cowl 306 includes a single bulkhead 414 (the only bulkhead connecting the outer barrel 404 and the inner barrel 402). FIG. 5 illustrates an example wherein the inlet cowl 306 includes an additional bulkhead 516 disposed between the inner barrel 502 and the outer barrel 504 and positioned aft of the other bulkhead 514. Example materials for the bulkhead (414, 514) include, but are not limited to, at least one material selected from metal, plastic, polymer, carbon fiber, and a composite comprising graphite and epoxy.

In various examples, the forward most edge 416, 524 of the acoustic panel 406, 506 is at any distance in a range of L2=0-18 inches along the surface of the lipskin 410. The acoustic panel 406, 506 extends any length from the lipskin 410 to any position between the lipskin 410 and the fan case 454 and may even extend aft of a forward most edge 928, 462 of the fan case 454, 904 (see also FIG. 9) so as to be disposed on or in the fan case 454, 904. In one or more embodiments, the forward most edge 416,524 is at a joint or interface between the acoustic panel 406, 506 and the lipskin 410, 510.

FIG. 4A illustrates the bulkhead 414 positioned in the aft half of the length L or L1 of the inlet cowl 306, closer to the nearest interface 440 between the inlet cowl 306 and the fan case 904, 454 than to the forward-most point 418 on the lipskin 410. The bulkhead 414 is inclined and includes an incline, curve, or a bend 452, so that the outer attach point or outer mating surface 424 between the bulkhead 414 and the outer barrel 404 is aft of the inner attach point or inner mating surface 426 between the bulkhead 414 and the inner barrel 402. The bulkhead 414 curves or bends aft to so as to provide stiffness to the bulkhead 414 and additional support for the outer barrel 404. In various examples, the outer mating surface 424 is between the end 456 of the outer barrel 404 and a position 460 that is 25% of L or L1 forward of the interface 440 with fan case 454. In one or more embodiments, the outer attach surface or outer mating surface 424 is between the bulkhead 414 and a flange 458 integrated with or connected with the outer barrel 404 and the inner mating surface 426 is between the bulkhead 414 and an integrated flange 442 that is integral with the inner barrel 402. The flanges 442, 458 may have dimensions determined by load requirements.

The inlet cowl 306 includes an aerodynamic transition 420a, 420b, 524a, 524b (e.g., comprising a a laminar to turbulent transition) at a location between the lipskin 410, 510 and the fan cowl 304 or on the portion of the inlet cowl that extends past the forward most part of the fan case 454. In one or more embodiments, the transition occurs due to the natural tendency of a boundary to undergo a transition, rather than because of a roughness element such as a step-gap interface. In one example, the bulkhead 414, 514 is disposed between the inner barrel 402, 502 and the outer barrel 404, 504 at a location forward of the aerodynamic transition 420b. In another example, the inner barrel 402, 502 has an interface 440 with the fan case 454 and the outer barrel 404 has a length L3 extending aft of the interface 440. In one or more embodiments, the length L3 is in a range of 2-24 inches aft of the forward most edge 928, 462 of the engine fan case 454, extending the aerodynamic transition 420b comprising a laminar to turbulent transition aft of the forward most edge 928, 462 of the engine fan case 454, aft of the bulkhead 414, and aft of the interface 440. In one or more examples, the portion of the outer barrel 404 extending aft of the bulkhead 414 is intended to allow the laminar boundary layer to continue past the bulkhead 414.

FIG. 4A and FIG. 5 further illustrate the acoustic panel 406 including (or integrated with) integrated flange 442 for attaching the inner barrel 402 to the fan case 454. As shown in the example of FIG. 4A, the acoustic panel 406 and the fan case 454 overlap and the acoustic panel 406 extends past a forward most edge 462 of the fan case 454 (or the acoustic panel 406 extends past an interface 440 with the fan case 454).

FIG. 4A and FIG. 5 illustrate the outer barrel 404, 504 comprises an integrally stiffened composite material 434. Examples of integrally stiffened composite material/panel include, but are not limited to, a composite sandwich (e.g., a thicker honeycomb core 408, 508 sandwiched between an outer cowl 408a and an inner cowl 408b), a hat stiffened material, and a blade stiffened material. In one or more examples, the composite sandwich comprises a thermoset composite or thermoplastic. The outer cowl 408a may comprise an integral coating that replaces paint and/or that is insect repellent and/or abrasion resistant. Example materials for the bulkhead 414 include at least one material selected from metal (e.g., aluminum, titanium), a thermoset composite, and a thermoplastic.

FIGS. 4A and 4B illustrate components of a Fluid Ice Protection System (FIPS) (porous panel 430, cavity 430b, and porous membrane 430c in the cavity 430b) combined with the inlet 300b. The lipskin 410 comprises or is combined with the porous panel 430. In one or more examples, the lipskin 410 comprises outer edge wall 432 (e.g., leading edge skin), the porous panel 430 is the outer edge wall 432, and the cavity 430b is between the outer edge wall 432 and an inner wall 436 of the inlet 300b.

In one or more embodiments, outer edge wall 432 or leading edge skin comprises metal including, but not limited to, aluminum or titanium and inner wall 436 comprises metal such as, but not limited to, aluminum or titanium, or a composite laminate. Examples of the composite laminate include, but are not limited to, a thermoset composite or a thermoplastic.

In one or more examples, perforations, small holes, or orifices in the external porous panel 430 or outer edge wall 432 allow ice protection fluid to weep/flow from the cavity 430b out onto the outer surface of the lipskin 410 and thereafter run back onto the acoustic panel 406, 506 and outer barrel 404, 504, e.g., so as to prevent ice build up at the forward most edge 416 and regions along at least the forward portion 490 of the acoustic panel 406, 506. The porous membrane 430c inside the cavity 430b ensures that the ice protection fluid is evenly distributed through the porous panel 430.

FIG. 4A, FIG. 4B, and FIG. 5 further illustrate a bonded or fastened joint or interface 428, 530 between the outer cowl 408a (of the outer barrel 404) and the lipskin 410. In one or more examples, the joint or interface 428 is a laminar flow compatible joint, so that the aerolines over the lipskin 410 and the outer barrel 404 are designed to achieve an extended run of laminar flow over the inlet cowl 306. In one or more examples, the joint or interface 428 bonds composite laminate (of the outer cowl 408a of the outer barrel 404) with the composite laminate of the lipskin 410.

FIG. 4A further illustrates an example wherein the angle 550 of the aerodynamic line 570 at the upstream edge E (at joint or interface 428 with the lipskin 410) of the outer barrel 404 is no less than 25 degrees (e.g., 30 degrees) from a line or direction 546 parallel to the longitudinal axis 312 of the turbofan engine 302.

Acoustic Panel

In various embodiments, the acoustic panel 406 is any noise dampener, insulator, or attenuator having a structure (e.g., liner, panel, or non-panel structure, or other acoustic treatment) facilitating reduction of noise generated by the fan 310 and compressor. Example structures include, but are not limited to, an acoustic panel or acoustic liner as described in U.S. Pat. Nos. 4,235,303, 8,820,477, 6,173,807, and 4,265,955.

FIG. 4A and FIG. 5 illustrate the acoustic panel 406 comprises a core 446 between a perforated or non-perforated layer 448 and an inner layer 450. In one or more examples, core 446 comprises a cellular structure (e.g., honeycomb structure) including cells separated by cell walls. In illustrative embodiments described herein, inner layer 450 is integral with or forms the integrated flange 442.

Figure 6:
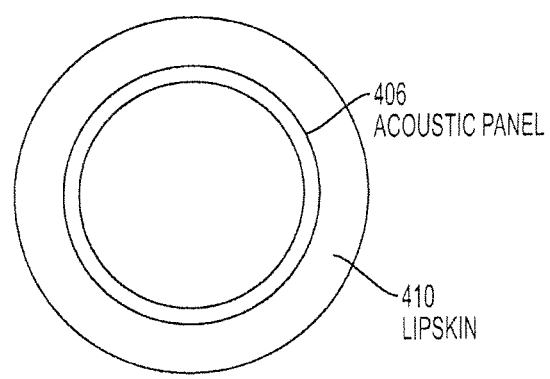
FIG. 6 illustrates an acoustic panel on an inlet according to one or more examples.

FIG. 4A, FIG. 5 and FIG. 6 illustrate an example wherein the acoustic panel 406 is visible on the lipskin 410 when viewing the lipskin head on (front view). The acoustic panel 406 is on the curved convex surface S of the lipskin 410, or on a portion of the lipskin 410 such that water droplets 534 impinging 536 onto the lipskin 410 and the acoustic panel 406, from a direction parallel 538 to the longitudinal axis 312 of the turbofan engine 302, are incident on the acoustic panel 406 at a non-zero angle 540 with respect to the surface 556 of the acoustic panel following the inner barrel 402.

Anti-Ice System

Figure 7:
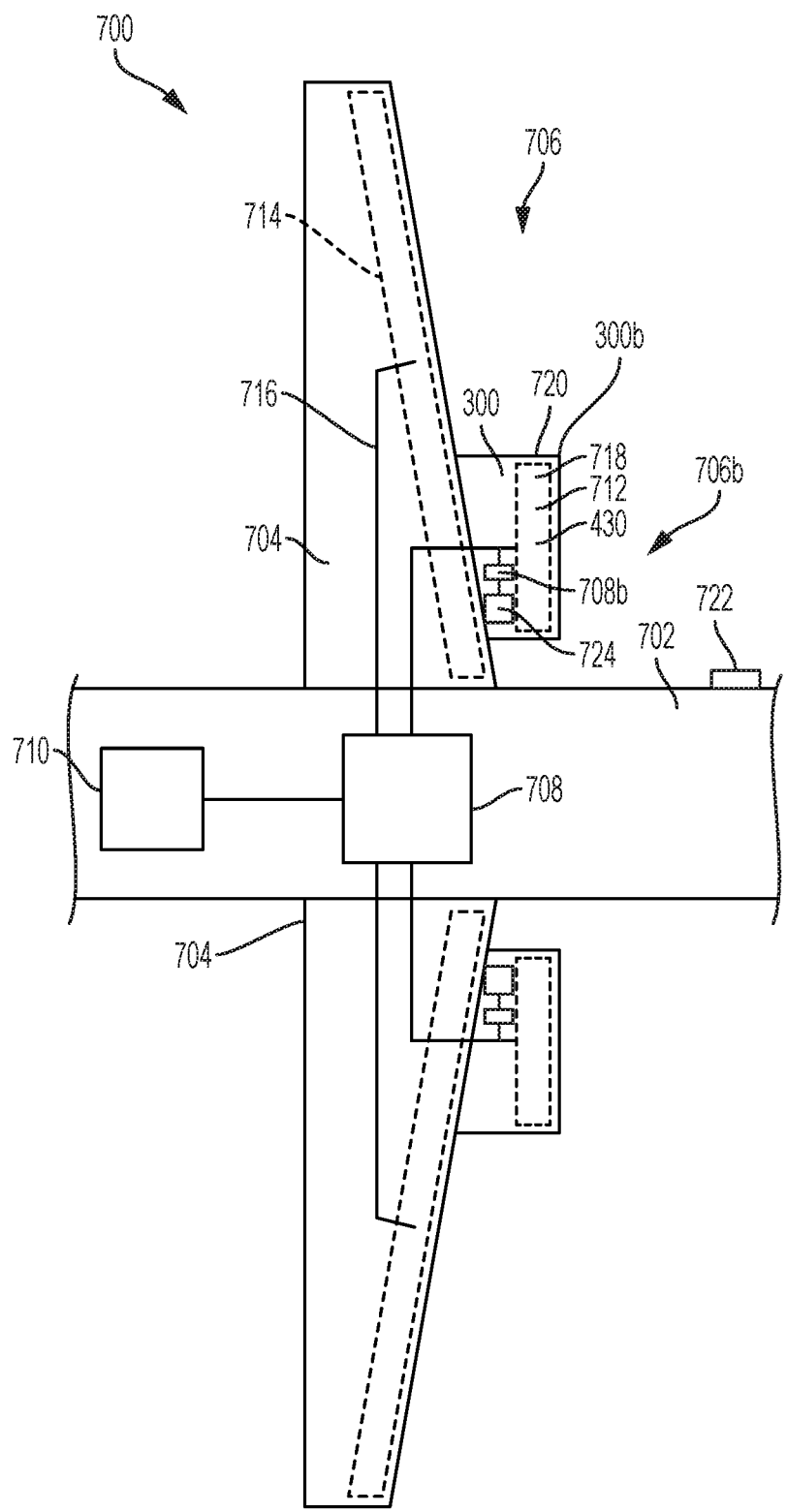
FIG. 7 illustrates an anti-ice system used with the inlets according to embodiments of the present disclosure.

FIG. 7 is a schematic view of an aircraft 700, illustrating a portion of the fuselage 702 and the wings 704 of the aircraft 700. The aircraft 700 includes a fluid ice protection system (FIPS) 706, 706b including a reservoir(s) 708a, 708b, a computer and electrical system 710, porous panel 430, porous membrane 712, 714, and hydraulic distribution system including (e.g., nylon) tubing, conduits, or ducting 716 distributing the ice protection fluid 718 from the reservoir 708a, 708b to the porous membrane 712 and porous panel 430 on/in the lipskin 410 and the porous membrane 714 or porous panel on/in the wing 704. Ice protection fluid weeps or flows through orifices 318 or pores on the porous panel 430 combined with lipskin 410, 510 or in outer edge wall 432. The ice protection system 706, 706b may recover at least some of the ice protection fluid 718 through apertures in a downstream region of the engine inlet 300b, and return the ice protection fluid 718 to the reservoir 708a, 708b.

Also shown is FIG. 7 is an ice/icing conditions detector 722. The ice/icing conditions detector 722 detects the buildup of ice 720 on the aerodynamic surface of the inlet 300b or wing 704 or detects that the aircraft is flying in conditions that would cause icing. In various aspects, computer or electrical systems 710 onboard the aircraft 700 monitor the ice detector 722 and automatically activate the anti-icing systems 706, 706b if icing and/or icing conditions are detected.

In one or more examples, an ice protection system 706b comprises a reservoir 708b and pump 724 dedicated to one or more of the inlets 300b. The pump 724 is connected to the reservoir 708b so as to pump ice protection fluid 718 from the reservoir 708b to the porous panel 430 on the inlet 300b. In one or more examples, the pump 724 and reservoir 708b are mounted on the inlet(s) 300b or fan case. In one or more further examples, there are separate and independent ice protection systems 706b (each including a reservoir 708b and pump 724) on each inlet 300b or fan case on the aircraft 700.

FIGS. 3, 4, and 5 further illustrate the porous panel 430 combined/integrated/included with or attached to the lipskin 410, 510 or leading edge of the inlet 300b and nacelle 300. Ice protection fluid 718 flows from the porous panel 430 and porous membrane 712, 430c onto/into the lipskin 410, 510 or leading outer edge wall 432 surface so as to reduce or prevent ice build-up 720 on the leading outer edge wall 432 or lipskin 410, 510 and on the acoustic panel 406. In one or more examples, a porous membrane 712, 430c is positioned in the lipskin 410 in a cavity 430b between the leading outer edge wall 432 and the inner sheet or wall 436.

In one or more embodiments, the fluid 718 runs back from the porous panel 430 onto the acoustic panel 406 so as to reduce or prevent ice build-up 720 at the forward most edge 416,524 of the acoustic panel 406, 506 and regions along at least the forward portion 490 of the acoustic panel 406, 506. In one or more further examples, the porous panel 430 or porous membrane 712 extends onto, into, or is integral with the acoustic panel 406. Ice protection fluid 718 weeping or flowing out of the plurality of orifices 318 or outlets in outer edge wall 432 onto the surface of the lipskin 410 or outer edge wall 432 can travel in the direction of arrow I toward an inward-facing downstream surface 320b of the nacelle 300 or in the direction of arrow J toward an outward-facing downstream surface 320a of the nacelle 300. In one example, the inward-facing downstream surface 320b of the nacelle 300 may include an aperture 324. The aperture 324 could be arranged as a continuous aperture or as a series of spaced-apart apertures. Ice protection fluid traveling toward the aperture 324 can be drawn into the aperture 324 in the direction of arrow K and water carried by the ice protection fluid can continue into the engine in the direction of arrow M. In another example, the outward-facing downstream surface 320a of the nacelle 300 may include an aperture 326. The aperture 326 could be arranged as a continuous aperture or as a series of spaced-apart apertures. Ice protection fluid traveling toward the aperture 326 can be drawn into the aperture 326 in the direction of arrow L and water carried by the ice protection fluid can continue aft in the direction of arrow N.

In one or more examples, the turbofan engines 302 used with the ice protection system 706 are smaller and more efficient, thereby enabling more efficient and lighter aircraft. One or more examples of the ice protection system enable the use of engines with very high bypass ratios and small cores because anti-ice bleed flow is reduced or eliminated.

Figure 1:
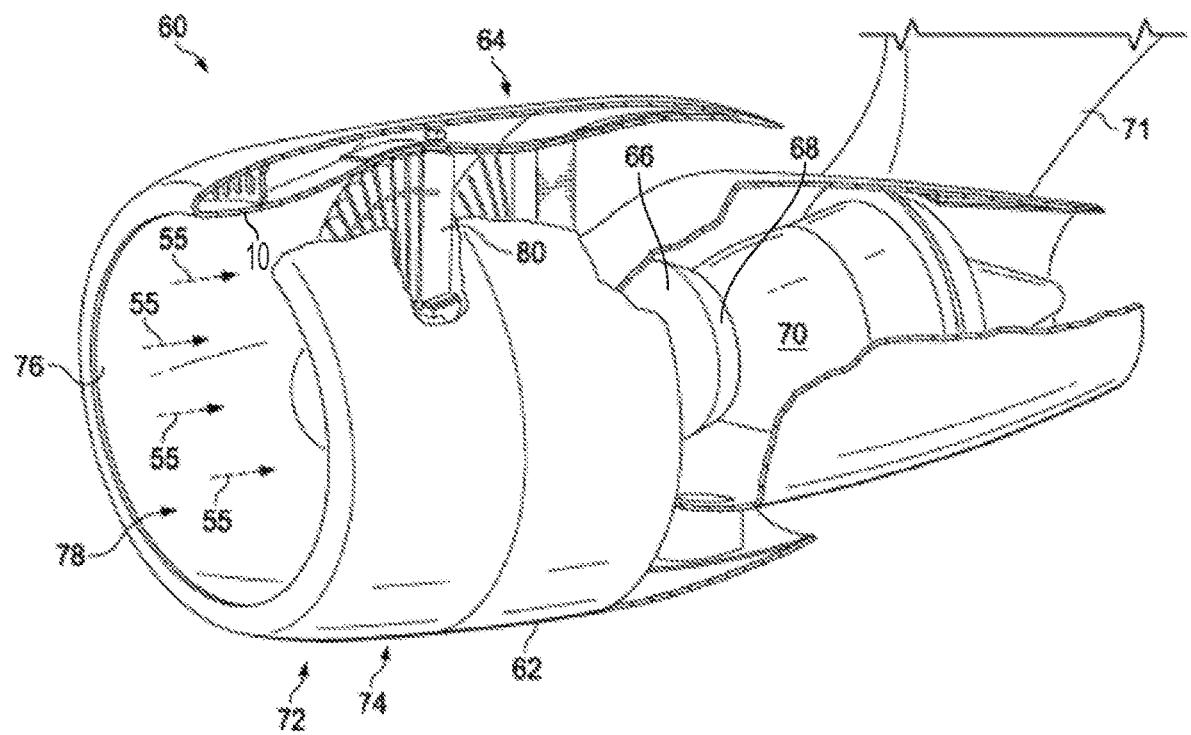
FIG. 1 is a schematic of a turbofan engine.
Figure 2:
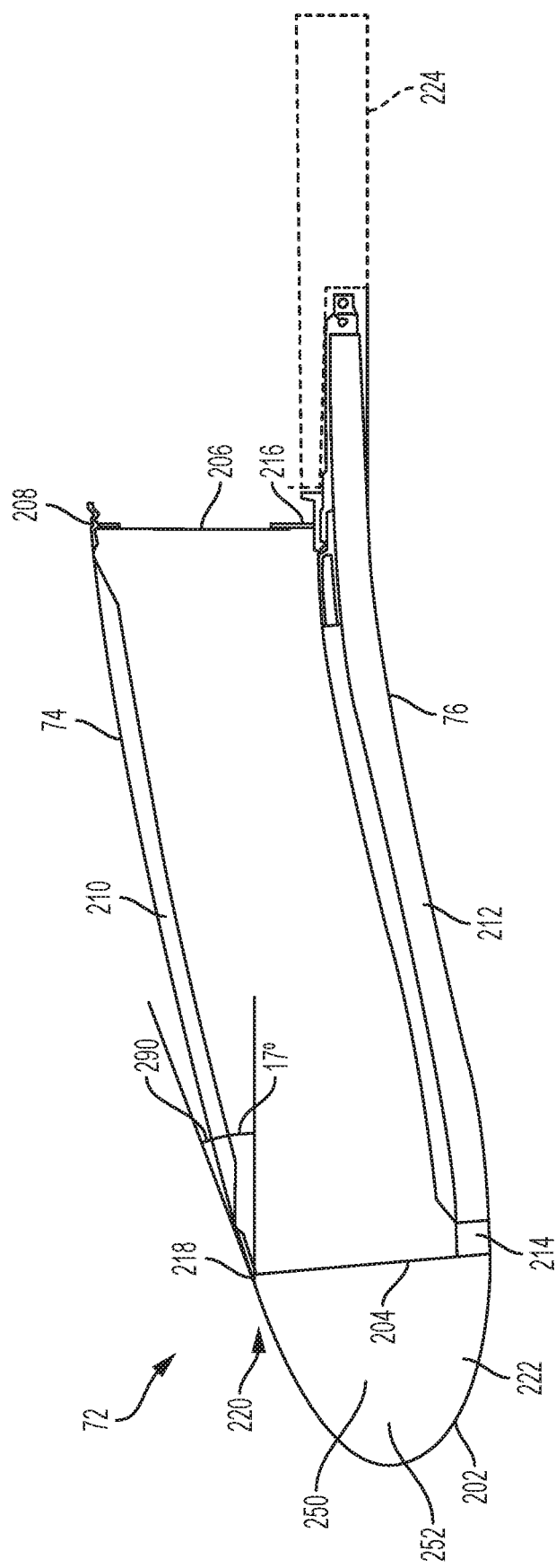
FIG. 2 illustrates a cross-section of a conventional engine inlet.

Further, in one or more examples, the use of the fluid ice protection system, which prevents ice build up on the acoustic panel, allows the acoustic panel to be extended forward, compared to the example of FIG. 2, thereby reducing the noise of the inlet/turbofan assembly.

Inlet Dimensions

Figure 8A:
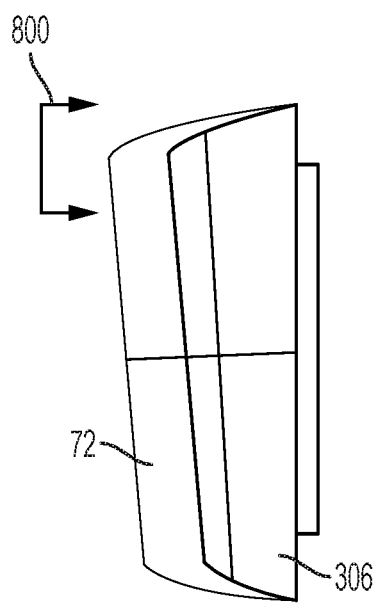
FIG. 8A and FIG. 8B illustrate dimensions of the inlets according to embodiments of the present disclosure.

FIG. 8A is a schematic illustrating the inlet 300b or inlet cowl 306 having a shorter length as compared to a conventional engine inlet 72. FIG. 8A also indicates the location 800 of the cross-sections in FIG. 2 and FIG. 4A (location of the cross-sections in FIGS. 4A and 5 are also shown by line 316 in FIG. 3).

Figure 8B:
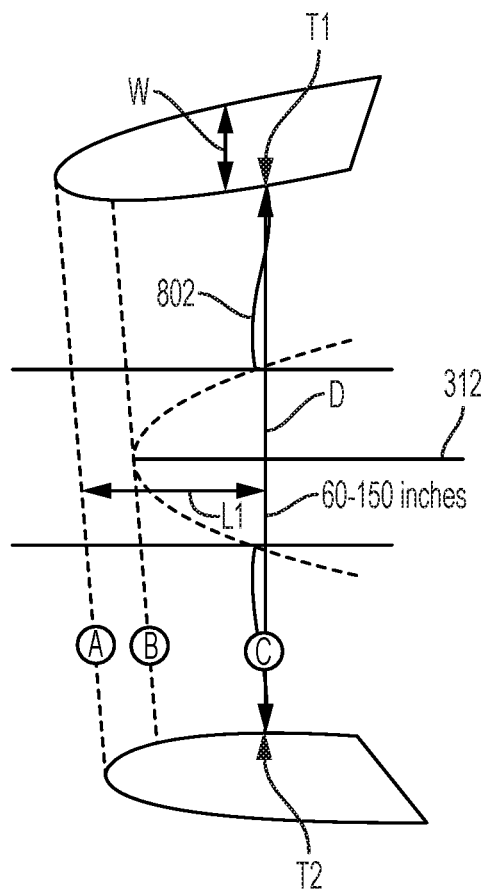

FIG. 8B is a cross sectional schematic illustrating the dimensions of the inlet cowl 306 or inlet 300b and fan. Considering a section cut of an inlet (also as shown in FIG. 4 or FIG. 5), a length L1 is defined between plane A (comprising the forward-most point 418 on the lipskin) and plane C defined by/containing/including the leading edge 802 of the fan blades 370 of the fan 310. More specifically, L1 is the perpendicular distance to plane C from the forward most point 418.

In one or more embodiments, the length L1 varies around the circumference (Circ) of the engine 302, in which case the average of the lengths L1 is defined as L1avg and is termed the inlet length or inlet cowl length. In one or more embodiments, L1avg is in a range of 6-70 inches. FIG. 8B further illustrates D is the average diameter of the fan 310, measured tip T1 to tip T2 at the leading edge 802 (e.g., in a range of 60-160 inches). In one or more examples L1avg/D is 0.4 or less or in a range of 0.2-0.4 (e.g., 0.3).

A combined effect of the shortened inlet or inlet cowl (including use of the composite materials) is to reduced drag, weight, and fuel consumption of the engine and aircraft.

Example Turbofans

Figure 9:
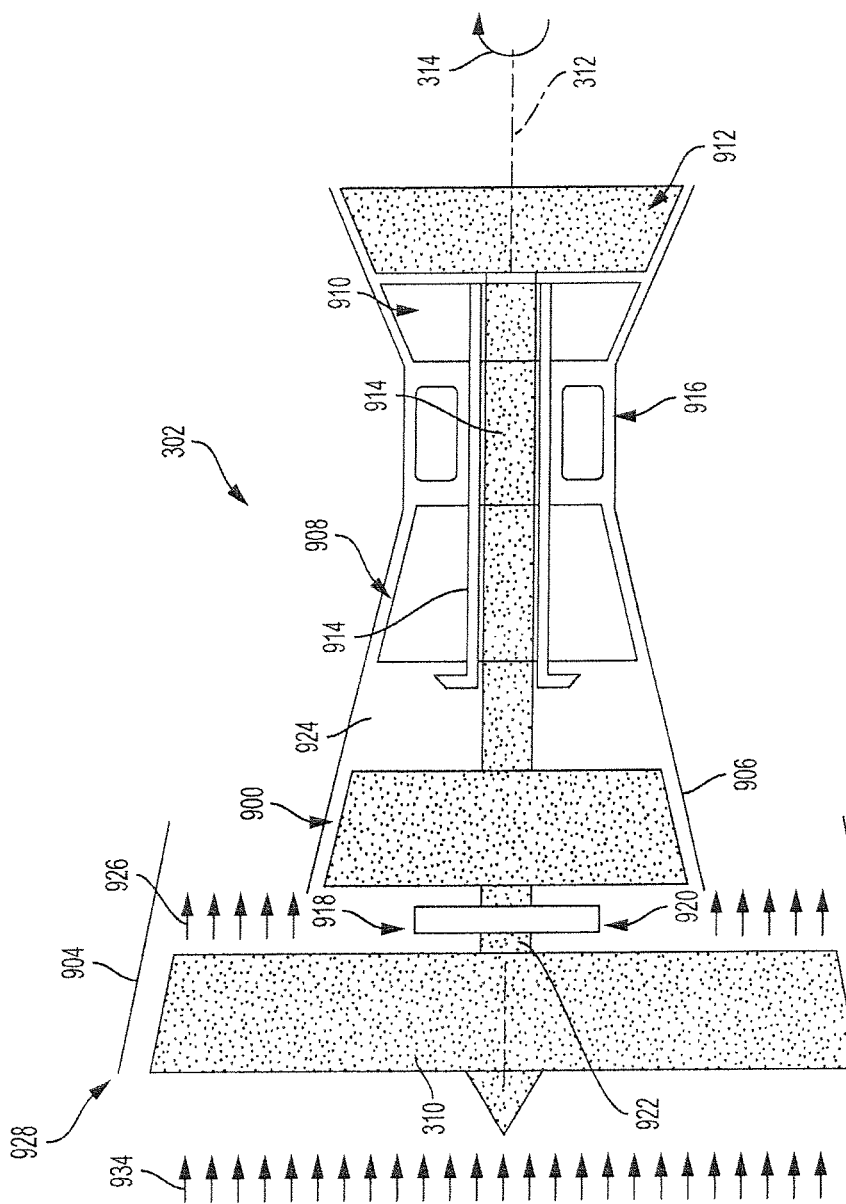
FIG. 9 illustrates a turbofan engine that may be combined the inlets according to embodiments of the present disclosure.

FIG. 9 illustrates an example turbofan engine used in combination with the nacelles described herein. The turbofan engine 302 comprises a fan 310, a low pressure (LP) compressor 900, a fan case 454, 904, an engine casing 906, a High Pressure (HP) compressor 908, a HP turbine 910, a LP turbine 912, and a LP shaft 914 connecting the LP compressor 900 and the LP turbine 912. In one or more embodiments, the turbofan engine 302 is a geared turbofan engine where a gearbox 920 (e.g., planetary reduction gearbox) or transmission 918 is disposed between the low pressure shaft 914 and the fan 310. However, in one or more further embodiments, the turbofan engine 302 is a direct drive turbofan engine where there is no gearbox 920 or transmission 918 disposed between the low pressure shaft 914 and the fan 310.

In various examples, the engine 302 has a bypass ratio (bypass flow:core flow) in a range of 9:1 to 15:1 (e.g., in a range of 10:1 up to 14:1), e.g., the ratio of amount of air flowing outside the engine core 926 to the amount of air 924 flowing inside the engine core. In yet further examples, the turbofan engine generates thrust in a range of 20,000 pounds (lbs)-120,000 lbs.

Process Steps

Manufacturing

Figure 10A:
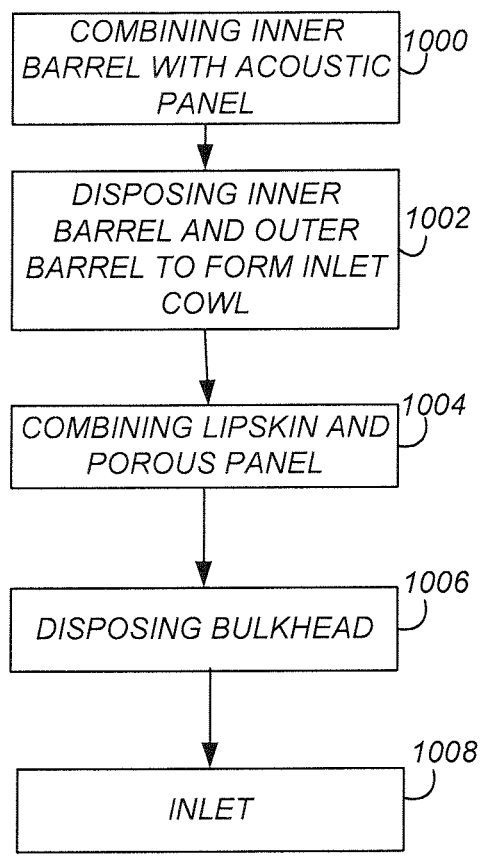
FIG. 10A illustrates a method of making an inlet according to one or more embodiments of the present disclosure.

FIG. 10A illustrates a method of fabricating an inlet 300b for a turbofan engine 302. The method may comprise the following steps.

Block 1000 represents combining an inner barrel 402,502 with an acoustic panel 406, 506.

Block 1002 represents disposing the inner barrel 402,502 and an outer barrel 404,504 to form an inlet cowl 306.

Block 1004 represents disposing a lipskin 410, 510 and porous panel 430 at a forward end 412, 512 of the inlet cowl 306. The step comprises attaching/combining the porous panel 430 to/with the lipskin 410, 510 or forming the lipskin 410, 510 comprising the porous panel 430.

Block 1006 represents disposing a bulkhead 414, 514 between the inner barrel 402,502 and the outer barrel 404,504 such that the acoustic panel 406, 506 extends forward of the bulkhead 414, 514. In one or more examples, the acoustic panel 406, 506 is positioned such that a tangent 576 to an aerodynamic line 578 of the acoustic panel 406, 506, at a forward most edge 416,524 of the acoustic panel 406, 506, is at an angle 582 no less than 10 degrees relative to the longitudinal axis 312 of the turbofan engine 302.

Block 1008 represents the end result, an inlet 300b.

Operation

Figure 10B:
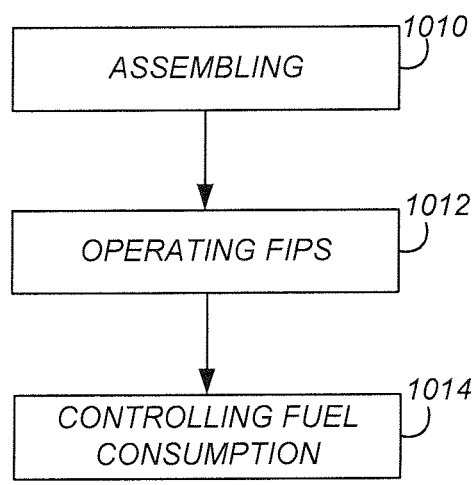
FIG. 10B illustrates a method of operating an engine combined with the inlets according to embodiments of the present disclosure.

FIG. 10B illustrates a method for operating/assembling an aircraft and/or increasing fuel efficiency of a turbofan engine.

Block 1010 represents disposing or obtaining the turbofan engine 302 in a nacelle 300 comprising an inlet 300b connected to a fan case 454 as described herein. In one or more examples, the nacelle 300 comprises an inner barrel 402,502 and an outer barrel 404,504 configured to form an inlet cowl 306, wherein the inner barrel 402,502 includes an acoustic panel 406, 506 and the inlet cowl 306 includes a lipskin 410, 510 and a bulkhead 414. The lipskin 410, 510 is disposed at a forward end 412, 512 of the inlet cowl 306. In one or more examples, the bulkhead 414, 514 disposed between the inner barrel 402,502 and the outer barrel 404,504 such that the acoustic panel 406, 506 extends forward of the bulkhead 414, 514 and such that a tangent 576 to an aerodynamic line 578 of the acoustic panel 406, 506, at a forward most edge 416,524 of the acoustic panel 406, 506, is at an angle 582 no less than 1 degree, no less than 5 degrees, or no less than 10 degrees relative to the longitudinal axis 312 of the turbofan engine 302. A porous panel 430 is combined with the lipskin 410, 510. The step further comprises mounting the nacelle 300 and turbofan engine 302 on an aircraft 700.

Block 1012 represents operating a fluid ice protection system 706 comprising the porous panel 430 combined with the lipskin 410 when the aircraft 700 encounters icing conditions. Ice protection fluid 718 flowing from the porous panel 430 as part of a FIPS 706, 706b reduces or prevents ice build-up 720 on the acoustic panel 406, 506 at the forward most edge 416,524 of the acoustic panel 406, 506 and regions along at least the forward portion of the acoustic panel 406, 506

Block 1014 represents operating the aircraft 700 and reducing fuel consumption of the turbofan engine 302 during operation of the aircraft as compared to the aircraft that does not utilize the novel inlets 300b and inlet cowls 306 described herein. For example, the step may comprise operating the turbofan engine 302 with reduced fuel consumption as compared to the turbofan engine 302 disposed in the nacelle 300 without the fluid ice protection system 706 (e.g., as compared to turbofan engine using an engine bleed air for ice protection). The step may further comprise operating the turbofan engine with reduced fuel consumption as compared to the engine having an inlet dimensioned such that L1avg/D is greater than 0.4.

Processing Environment

Figure 11:
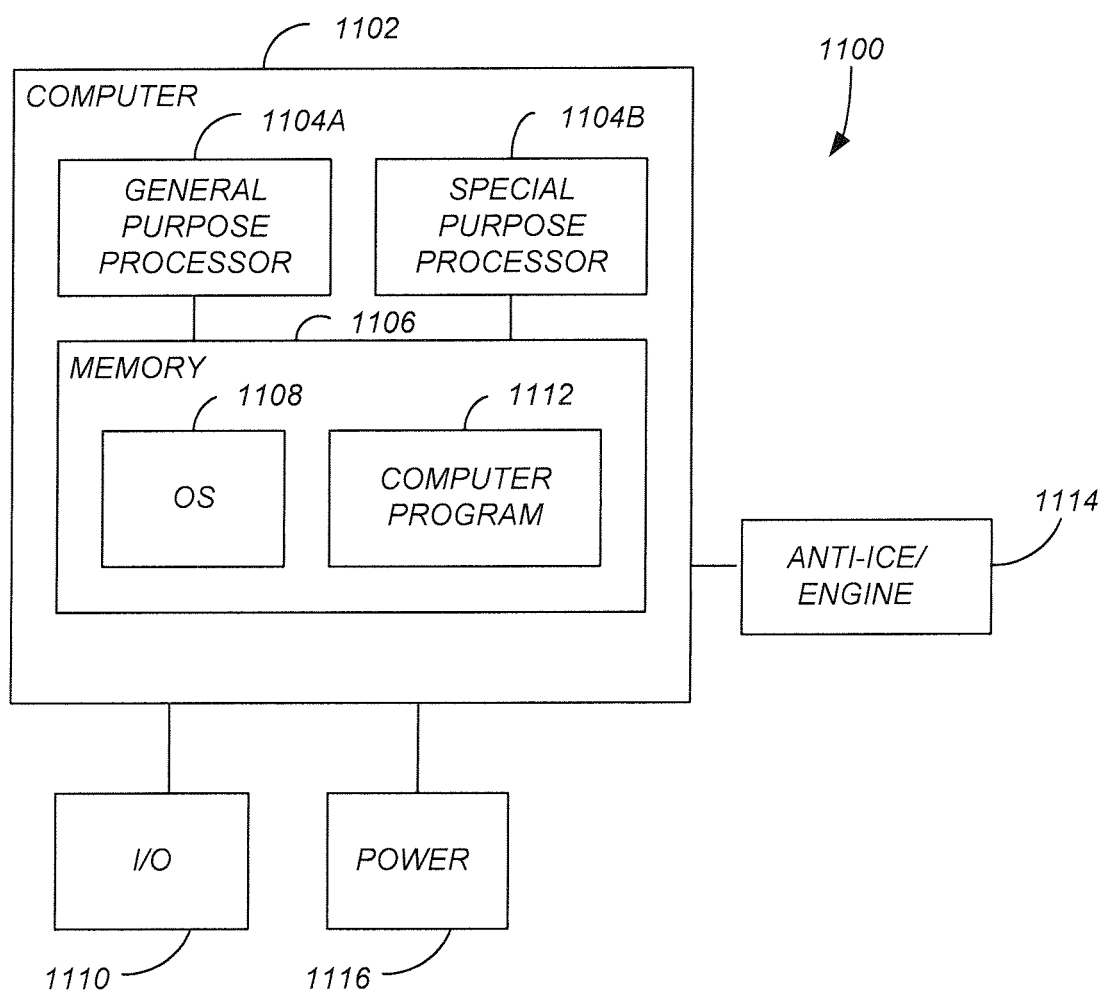
FIG. 11 is an example computer hardware environment for controlling the engine combined with the inlets according to embodiments of the present disclosure.

FIG. 11 illustrates an exemplary system 1100 used to implement processing elements needed to control the ice-protection system and/or the engines described herein.

The computer 1102 comprises a processor 1104 (general purpose processor 1104A and special purpose processor 1104B) and a memory, such as random access memory (RAM) 1106. Generally, the computer 1102 operates under control of an operating system 1108 stored in the memory 1106, and interfaces with the user/other computers to accept inputs and commands (e.g., analog or digital signals) and to present results through an input/output (I/O) module 1110. The computer program application 1112 accesses and manipulates data stored in the memory 1106 of the computer 1102. The operating system 1108 and the computer program 1112 are comprised of instructions which, when read and executed by the computer 1102, cause the computer 1102 to perform the operations herein described. In one embodiment, instructions implementing the operating system 1108 and the computer program 1112 are tangibly embodied in the memory 1106, thereby making one or more computer program products or articles of manufacture capable of reducing fuel consumption of the engine and/or controlling ice protection fluid flow in accordance with the capabilities of the inlet structures and ice-protection systems described herein. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Advantages and Improvements

The state-of-the-art inlet for the Boeing 747-8 has an inlet length/fan diameter of 0.55, a metallic structure with laminar-to turbulent transition located at an aft end of the inlet lip, an insulated aluminum forward bulkhead, an acoustic panel, and a thermal isolation (aft of the inlet lip) between the insulated aluminum forward bulkhead and the acoustic panel. The step and gap at the interface between the lipskin and outer barrel limits the extent of attainable laminar flow. Moreover, the state of the art Boeing 747-8 uses a conventional anti-ice system using pressurized hot engine bleed air in the inlet area forward of the bulkhead.

As described herein, however, using a low temperature fluid ice protection system (instead of a conventional anti-ice system using pressurized hot engine bleed air) enables an innovative compact structural concept having an inlet length/fan diameter of 0.4 or less (e.g. 0.32). The use of a shortened inlet is surprising and unexpected because shortened inlets have less area availability for the acoustic attenuation structure and limit the length of the run of laminar flow. However, the inlet structures presented herein address these problems by extending the acoustic treatment onto the leading edge of the inlet (in one example providing more than 20% additional acoustic treatment) and moving the laminar-to-turbulent transition goal aft from the leading edge area. The extension of acoustic treatment into the leading edge area is enabled by the advanced low power anti-ice/de-ice system (fluid protection system) compatible with compact inlet and acoustic liners. The extended run of laminar flow (moving the laminar-to-turbulent transition goal area aft) is enabled by a laminar flow compatible joint at the interface between the lipskin and outer barrel, by extending the outer barrel aft of the interface with the fan case, and/or by the elimination of the forward bulkhead.

The advanced inlet design further has the following advantages:

A technical effect of the FIPS system on the inlet lipskin is that thermal protection is not required. Elimination of the forward bulkhead and the EAI hot air cavity forward of the bulkhead eliminates the need for thermal isolation, thereby enabling increased use of composite materials in the area aft of the lipskin, decreasing weight of the inlet, and allowing the use of insect repelling and abrasion resistant coating. Thus, in one or more embodiments, the forward most bulkhead 414 (or only bulkhead 414) disposed between the inner barrel 402,502 and the outer barrel 404,504 can comprise or consist essentially of composite material or material that does not include thermal isolation from anti-ice system using engine bleed air (EAI system). In conventional inlets, on the other hand, the forward bulkhead is designed first to contain the high pressure, high temperature engine bleed air used for the hot air ice protection system and second to protect the remaining inlet structure from the high temperatures of the hot air ice protection system.

The use of fan case attach flanges integral to the composite acoustic panel (instead of a metallic flange bolted to the acoustic panel) enables weight efficient attachment of the inlet to the fan case. The flange integral to the acoustic panel also maximizes the acoustic treatment in the inlet.

The laminar flow compatible joint enables an extended run of laminar flow to be obtained from a metallic lipskin and a composite outer barrel.

The portion of the outer barrel extending aft of the bulkhead is intended to allow the laminar boundary layer to continue past the bulkhead.

The portion of the outer barrel extending past the foremost point of the fan case is intended to allow the laminar boundary layer to continue past this point.

The use of the FIPS allows the interface between the outer barrel and the lipskin to be further forward, or at a steeper angle 550 because the ice protection fluid runs back from the porous panel to protect the surface aft of the porous panel. Accordingly, the angle 550 is steeper as compared to the angle 290 (e.g., 17 degrees) in the configuration in FIG. 2 using an EAI that relies on the hot air in the cavity forward of the bulkhead. However, the angle can vary around the circumference of the inlet.

The use of the fluid ice protection system also allows the acoustic panel to extend forward onto the leading edge surface so that the acoustic panel can be viewed from the front view of the inlet. In one or more examples, a tangent 576 to an aerodynamic line 578 of the acoustic panel 406, 506, at a forward most edge 416 of the acoustic panel 406, 506, is at an angle 582 no less than 10 degrees relative to the longitudinal axis 312 of the turbofan engine 302. When the fluid ice protection system is operating, the fluid weeping or flowing from the porous panel flows or runs back onto the acoustic panel, thereby preventing ice from building up on both the porous panel and the acoustic panel (including at the forward most edge 416,524 of the acoustic panel 406, 506).

Thus, the present disclosure describes novel inlet structures that unexpectedly and surprisingly maximize the acoustic treatment in a short inlet, while minimizing the weight, drag and fuel consumption of the inlet/engine assembly.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An inlet for a turbofan engine, the inlet comprising:
an inner barrel and an outer barrel configured to form an inlet cowl, wherein the inner barrel includes an acoustic panel and the inlet cowl includes:
a lipskin disposed at a forward end of the inlet cowl; and
a bulkhead disposed between the inner barrel and the outer barrel; and
a porous panel combined with the lipskin; wherein:
the porous panel comprises orifices and an ice-protection fluid flows from the porous panel onto the acoustic panel so as to reduce or prevent ice build-up on the acoustic panel; and
the acoustic panel extends past a forward most edge of a fan case connected to the inlet and the porous panel is part of a fluid ice protection system comprising a pump connected to a reservoir, the pump pumping the ice-protection fluid from the reservoir to the porous panel.

2. The inlet of claim 1, wherein the acoustic panel extends forward of the bulkhead such that a tangent to an aerodynamic line of the acoustic panel, at a forward most edge of the acoustic panel, is at an angle no less than 10 degrees relative to a direction parallel a longitudinal axis of the turbofan engine.

3. The inlet of claim 2, wherein the forward most edge of the acoustic panel is at a distance (L2) along the lipskin in a range of 0-18 inches from a forward most point on the inlet cowl.

4. The inlet of claim 1, wherein:
the outer barrel has a length (L3) extending aft of an interface between the inner barrel and the fan case connected to the inner barrel, thereby causing an aerodynamic transition between a laminar flow and a turbulent flow of airflow to move aft of the interface.

5. The inlet of claim 1, wherein the bulkhead is the only bulkhead connecting the outer barrel and the inner barrel.

6. The inlet of claim 1, further comprising a fan cowl connected to inlet cowl, wherein:
the inlet cowl includes an aerodynamic transition at a location between the lipskin and the fan cowl; and
the bulkhead is disposed between the inner barrel and the outer barrel at a location forward of the aerodynamic transition.

7. The inlet of claim 1, wherein:
an angle of an aerodynamic line at an upstream edge (E) of the outer barrel is no less than 25 degrees from a direction parallel to a longitudinal axis of the turbofan engine, and
the upstream edge (E) is at an interface with the lipskin.

8. The inlet of claim 1, wherein:
the acoustic panel includes a flange integral with the acoustic panel and the inner barrel, and the flange is configured for attaching the inner barrel to the fan case.

9. The inlet of claim 1, wherein an outer mating surface between the bulkhead and the outer barrel is aft of an inner mating surface between the bulkhead and the inner barrel.

10. The inlet of claim 9, wherein the bulkhead includes a bend towards the outer mating surface so as to increase stiffness of the bulkhead and provide additional support to the outer barrel.

11. An assembly comprising the inlet of a turbofan engine of claim 1, wherein the turbofan engine is a geared turbofan engine comprising a gearbox or transmission disposed between a low pressure shaft and a fan.

12. An assembly comprising the inlet of a turbofan engine of claim 1, wherein the turbofan engine has a bypass ratio in a range of 9:1 to 15:1.

13. An assembly comprising a turbofan engine including a fan and the inlet of claim 1, wherein:
the fan comprises fan blades having a leading edge,
the fan has an average diameter D measured from tip T1 to tip T2 of the fan blades at the leading edge,
the inlet cowl has a length L1 varying about a circumference (Circ) of the turbofan engine,
L1 is defined as a distance perpendicular from a plane (C), the plane (C) including the leading edge of the fan blades, to a forward most point on the lipskin,
an average of the length L1 is defined as L1avg, and L1avg/D is in a range of 0.2-0.4.

14. The inlet of claim 1,
wherein the bulkhead is the only bulkhead connecting the outer barrel and the inner barrel and the bulkhead does not include thermal isolation from engine bleed air.

15. The inlet of claim 14, wherein the bulkhead consists essentially of composite material.

16. The inlet of claim 14, wherein the bulkhead comprises a thermoplastic or a thermoset composite.

17. An inlet for a turbofan engine, the inlet comprising:
an inner barrel and an outer barrel configured to form an inlet cowl;
the inner barrel including an acoustic panel and
the inlet cowl including:
a lipskin disposed at a forward end of the inlet cowl;
a bulkhead disposed between the inner barrel and the outer barrel; and
a porous panel combined with the lipskin;
wherein:
the outer barrel has a length (L3) extending aft of an interface between the inner barrel and a fan case connected to the inner barrel, thereby causing a location of an aerodynamic transition between laminar flow and turbulent flow of airflow to move aft of the interface;
the porous panel comprises orifices and an ice-protection fluid flows from the porous panel onto the acoustic panel so as to reduce or prevent ice build-up on the acoustic panel; and
the acoustic panel extends past a forward most edge of the fan case connected to the inlet and the porous panel is part of a fluid ice protection system comprising a pump connected to a reservoir, the pump pumping the ice-protection fluid from the reservoir to the porous panel.

18. A method of operating a turbofan engine, comprising:
obtaining a turbofan engine disposed in a nacelle comprising an inner barrel and an outer barrel configured to form an inlet cowl, wherein:
the inner barrel includes an acoustic panel, and
the inlet cowl includes:
a lipskin disposed at a forward end of the inlet cowl,
a bulkhead disposed between the inner barrel and the outer barrel, and
a porous panel combined with the lipskin;
operating a fluid ice protection system comprising the porous panel comprising orifices and combined with the lipskin; wherein ice-protection fluid flowing from the orifices onto the acoustic panel reduces or prevents ice build-up on the acoustic panel; and
operating the turbofan engine with reduced fuel consumption as compared to the turbofan engine disposed in the nacelle without the fluid ice protection system; wherein:
the acoustic panel extends past a forward most edge of a fan case connected to the inlet and the porous panel is part of the fluid ice protection system comprising a pump connected to a reservoir, the pump pumping the ice-protection fluid from the reservoir to the porous panel.

19. The method of claim 18, wherein:
the turbofan engine comprises a fan including fan blades having a leading edge and the fan has an average diameter D measured from tip T1 to tip T2 of the fan blades at the leading edge,
the inlet cowl has a length L1 varying about a circumference (Circ) of the turbofan engine,
L1 is defined as a distance perpendicular from a plane (C), the plane (C) including the leading edge of the fan blades, to a forward most point on the lipskin,
an average of the length L1 is defined as L1avg, and L1avg/D is in a range of 0.2-0.4, the method further comprising operating the turbofan engine with a reduced fuel consumption as compared to the turbofan engine wherein L1avg/D is greater than 0.4.

20. The method of claim 18, wherein the outer barrel has a length (L3) extending aft of an interface between the inner barrel and the fan case connected to the inner barrel, thereby causing a location of an aerodynamic transition between a laminar flow and a turbulent flow of airflow to move aft of the interface.

21. The method of claim 18, wherein the acoustic panel extends forward of the bulkhead such that a tangent to an aerodynamic line of the acoustic panel, at a forward most edge of the acoustic panel, is at an angle no less than 10 degrees relative to a direction parallel a longitudinal axis of the turbofan engine.

* * * * *